(12) United States Patent
Hughes et al.

(10) Patent No.: US 6,827,995 B2
(45) Date of Patent: Dec. 7, 2004

(54) COMPOSITES USEFUL AS FENCE AND DECKING COMPONENTS AND METHODS FOR PRODUCING SAME

(75) Inventors: Roderick E. Hughes, Newport Beach, CA (US); Kevin Fidati, Fayetteville, GA (US); Joe Schiff, Peachtree City, GA (US); Jack Cuttle, Fairburn, GA (US); George Vuduris, Peachtree City, GA (US)

(73) Assignees: Extrutech International, Inc., Costa Mesa, CA (US); Tri-Ex Composites, Incorporated, Neunan, GA (US)

( * ) Notice: Subject to any disclaimer, the term of this patent is extended or adjusted under 35 U.S.C. 154(b) by 0 days.

(21) Appl. No.: 09/761,331

(22) Filed: Jan. 16, 2001

(65) Prior Publication Data

US 2002/0094431 A1 Jul. 18, 2002

(51) Int. Cl.$^7$ .................................................. B32B 1/08
(52) U.S. Cl. ................ 428/36.5; 428/36.91; 428/319.7; 428/317.9; 52/309.1; 52/309.4
(58) Field of Search ............................... 428/365, 36.91, 428/319.7, 313.3, 76, 71, 313.5, 318.6, 319.3, 314.7, 311.11, 311.71, 308.8, 308.4; 524/13; 52/309.1, 309.4

(56) References Cited

U.S. PATENT DOCUMENTS

| | | |
|---|---|---|
| 3,041,719 A | 7/1962 | Haseltine |
| 3,489,392 A | 1/1970 | Thom |
| 3,554,494 A | 1/1971 | Bee |
| 3,944,631 A | 3/1976 | Yu et al. |
| 4,151,226 A | 4/1979 | Morinaga et al. |
| 4,181,764 A | 1/1980 | Totten |
| 4,208,175 A | 6/1980 | Rosenbaum |
| 4,249,875 A * | 2/1981 | Hart et al. ............... 425/133.1 |
| 4,453,357 A | 6/1984 | Zwilgmeyer |
| 4,514,449 A | 4/1985 | Budich et al. |
| 4,517,339 A | 5/1985 | Aliberto et al. |
| 4,610,902 A | 9/1986 | Eastman |
| 4,731,414 A | 3/1988 | Ting |
| 4,746,688 A | 5/1988 | Bistak et al. |
| 4,831,079 A | 5/1989 | Ting |
| 4,860,996 A * | 8/1989 | Robbins, III .................. 256/10 |
| 4,964,618 A * | 10/1990 | Kennedy et al. ............... 256/24 |
| 5,077,948 A | 1/1992 | Olson et al. |
| 5,100,109 A | 3/1992 | Robbins, III |
| 5,329,741 A | 7/1994 | Nicolaidis et al. |
| 5,404,685 A | 4/1995 | Collins |
| 5,416,139 A | 5/1995 | Zeiszler |
| 5,418,028 A | 5/1995 | DeWitt |
| 5,486,553 A * | 1/1996 | Deaner et al. ................. 524/13 |
| 5,706,620 A | 1/1998 | De Zen |
| 5,743,986 A | 4/1998 | Colombo |
| 5,847,016 A | 12/1998 | Cope |
| 5,858,493 A * | 1/1999 | Sandt ....................... 428/36.91 |
| 5,883,191 A * | 3/1999 | Hughes ........................ 525/85 |
| D409,869 S | 5/1999 | Marusak |
| 5,899,442 A | 5/1999 | Meglino et al. |
| 5,953,878 A | 9/1999 | Johnson |
| 6,039,307 A | 3/2000 | De Zen |
| 6,054,207 A * | 4/2000 | Finley ..................... 428/317.9 |
| 6,133,349 A | 10/2000 | Hughes |
| 6,265,037 B1 * | 7/2001 | Godavarti et al. ............ 428/34 |
| 6,295,782 B1 | 10/2001 | Fyfe |
| 6,344,268 B1 * | 2/2002 | Stucky et al. ............ 428/317.9 |
| 6,434,906 B1 | 8/2002 | Jernstrom |
| D462,458 S | 9/2002 | Hughes et al. |

* cited by examiner

*Primary Examiner*—Terrel Morris
*Assistant Examiner*—Hai Vo
(74) *Attorney, Agent, or Firm*—Stout, Uxa, Buyan & Mullins, LLP; Frank J. Uxa (57) ABSTRACT

Composite fence and decking components, for example, rails, posts and planks, are provided which generally include a weatherable outer layer, a core layer made of a thermoplastic polymeric composition and a wood component in an amount effective as a filler, and an inner layer made of a thermoplastic material. The layers are configured so as to form a generally central hollow space. The components are light weight and inexpensive to manufacture. The components can be manufactured by using a single coextrusion process to produce a cylindrical form. The cylindrical form is passed through a reshaping die to form a composite having a desired cross sectional form, for example, a composite with a substantially square or rectangular cross section.

47 Claims, 4 Drawing Sheets

COMPOSITES USEFUL AS FENCE AND DECKING COMPONENTS AND METHODS FOR PRODUCING SAME

BACKGROUND OF THE INVENTION

The present invention generally relates to composites and more specifically relates to composites useful as fence components, decking components and the like, and methods for producing same.

Traditionally, fences and decks have been made of components fashioned from solid wood. Wood fences and decks are often considered more aesthetically appealing than those made of metal or cement, for example, wire fences or cement block walls or decks. However, construction of a wood fence or a wood deck is labor intensive. Solid wood components are heavy and cumbersome. In addition, maintenance of a wood fence or deck is expensive. After a period of time, solid wood fence and deck components will naturally begin to break down from weather exposure and pest infestations. It is known that this deterioration can be tempered by treating the fence or deck with widely available weather resistant coatings, paints, varnishes, finishes and the like. Unfortunately however, it is often only a matter of time before such treated fences or decks deteriorate requiring partial or complete replacement. Many solid wood materials that are suitable for fencing or decking are costly. In addition, because of natural variations in wood, replacement of individual components may result in an inconsistent, uneven appearance to the fence or deck.

Plastic fence components have been developed as alternatives or supplements to traditional, natural wood fences. For example, Robbins, III, U.S. Pat. No. 5,100,109 describes a method of constructing a fence by providing a flexible, plastic, rollable fence board that can be unrolled and fastened to spaced apart fence posts. The flexible fence board is made with height and width dimensions simulating a standard wooden board and with a length of 350 feet or more. According to this patent, the fence board is formed in a continuous extrusion process of a flexible thermoplastic material.

Collins U.S. Pat. No. 5,404,685, describes a wall or fence made in part of foamed polystyrene plastic components, more specifically, STYROFOAM™ polystyrene plastic columns and panels. Construction of a fence in accordance with the Collins Patent requires multiple steps. For example, wall or fence stability is achieved by pouring a reinforcing filler, such as concrete, into a hollow of the polystyrene plastic columns after the columns have been secured to the ground. A hardened outer surface of the fence is achieved by applying an exterior finish, such as stucco or special exterior paint, to the fence or wall after the fence has been constructed.

There still remains a need in the market today for inexpensive, lightweight fencing and decking components and fence and deck systems that are sturdy, weather resistant, lightweight, and aesthetically appealing, and easy to manufacture using simple manufacturing techniques.

SUMMARY OF THE INVENTION

New composites, for example, useful in fence and deck systems and fence and decking components, such as rails, fence posts, fence slats, decking planks and the like, as well as methods for producing same have been discovered. The composites are easy to manufacture in a variety of configurations using relatively inexpensive materials. In addition, the composites are sturdy, lightweight and have excellent weatherability properties. In addition, the composites have many of the desirable properties of natural wood fences and decks. For example, the composites, in the form of fence and deck systems or fence and decking components, of the invention can be made to have a wood-like look and texture. However, unlike solid wood fences and decks, the composites of the present invention preferably are highly resistant to effects of weathering.

In a broad aspect of the invention, a layered composite is provided, which can be formed, for example, as a fence component or as a decking component.

The present composites, in general, comprise an outer layer comprising present composites a first polymeric material; a core layer, circumscribed by the outer layer and comprising a second polymeric material; and an inner layer, circumscribed by the core layer and comprising a third polymeric material, wherein the inner layer defines a hollow space. Preferably, the composites of the present invention are in the form of a member having a length defined along a longitudinal axis of the member. The hollow space preferably extends along substantially the entire length of the member. The core layer preferably is substantially completely circumscribed by the outer layer along substantially the entire length of the member and/or the inner layer preferably is substantially completely circumscribed by the core layer along substantially the entire length of the member. The member may have any suitable axial cross-section, such as circular, rectangular, oval, an irregularly shaped cross-section and the like. In one useful embodiment, the member has a substantially rectangular, for example, an elongated rectangular or square, axial cross-section, that is perpendicular to the length or longitudinal axis of the member.

In one especially advantageous embodiment of the invention, the composite is structured in the form of a fence building component or a fence component, for example, the composite may be in the form of a fence post or a fence rail or the like. Moreover, in accordance with the present invention, a fencing system is provided including a plurality of fence components, for example, a plurality of fence posts and a plurality of fence rails, wherein each of the fence components, e.g., each of the fence posts and fence rails, comprise a composite described herein.

In another useful embodiment, the composite is structured in the form of a deck building component or a decking component, for example, the composite may be in the form of a decking plank or the like. A deck system or decking system is provided in accordance with the present invention including a plurality of decking components, for example, a plurality of decking planks, wherein each of the decking components, e.g., each of the decking planks, comprise a composite described herein.

Each one of the first, second and third polymeric materials of the composite layers preferably comprises a thermoplastic polymeric material. In one embodiment of the invention, at least two of the first, second and third polymeric materials have different chemical compositions.

Preferably, the outer layer is made of a weatherable, thermoplastic polymeric material. The outer layer advantageously is substantially solid. As used herein, the term "weatherable" refers to the ability or property of a material to effectively withstand the conditions of an out-of-doors environment for a long period of time, for example, at least about five years and preferably at least about seven years or longer. Specific examples of polymers which can be used as the outer layer include, without limitation, polyvinylchloride, acrylonitrile/styrene/acrylic polymeric materials, and the like and mixtures or combinations thereof.

Preferably, the second material comprises a solid thermoplastic polymeric material or a thermoplastic polymeric material foam or combinations thereof, and an effective amount of a filler. Suitable polymeric materials for the core layer include, without limitation, polyvinylchloride, acrylonitrile/styrene/acrylic polymeric materials, acrylonitrile/butadiene/styrene polymeric materials, and the like and mixtures or combinations thereof. Any suitable filler component may be present in any of the layers of the present composites. Such filler component or components preferably are effective to add bulk and/or strength and/or reinforcement and/or stability to the layer and/or composite. Examples of useful filler components include, without limitation, wood, mica, talc, calcium carbonate, graphite or carbon, for example, in the form of particles, such as fibers, and the like and mixtures thereof. A filler component is particularly advantageous in the core layer, while the inner layer and/or outer layer preferably and substantially free of filler component. Preferably, the filler component of the core layer material comprises a wood component such as, but not limited to, wood particles, for example, wood shavings, wood chips, wood flour and the like and mixtures thereof. This use of a wood component advantageously provides an effective filler without unduly increasing the weight or cost of the composite.

The inner layer is circumscribed by the core layer and defines or bounds the hollow space of the composite. The inner layer can be made of a thermoplastic material which need not be weatherable, but preferably is effectively impact resistant. The inner layer is preferably substantially solid. Examples of materials that are suitable as the third polymeric material include, without limitation, polyvinylchloride, acrylonitrile/butadiene/styrene polymeric materials and the like and mixtures or combinations thereof.

Advantageously, the composites in accordance with the invention can be produced using a single coextrusion process using a suitable feedblock, pipehead and forming die assembly. The methods, in accordance with the present invention, for producing such composites comprise providing the desired materials, in an extrudable state, for the outer layer, the core layer and the inner layer, and passing the materials, by means of or through, three coextruders, into a feedblock/pipehead assembly to produce a material form having a radially layered, annular cross-section, for example, a substantially circular cylindrical axial cross-section. This material form is passed through a shaper die and is reconfigured thereby to produce or form a hollow, layered composite having a desired cross-section, for example, a square, elongated rectangle or other desired cross-section shape. Composites can be formed, e.g. cut, into different lengths and configurations to be useful as fence components, for example, rails and posts.

Any and all features described herein and combinations of such features are included within the scope of the present invention provided that the features of any such combination are not mutually inconsistent.

These and other features, aspects and advantages of the present invention will become apparent hereinafter, particularly when considered in conjunction with the following claims and detailed description in which like parts bear like reference numerals.

DETAILED DESCRIPTION

Figure 1:
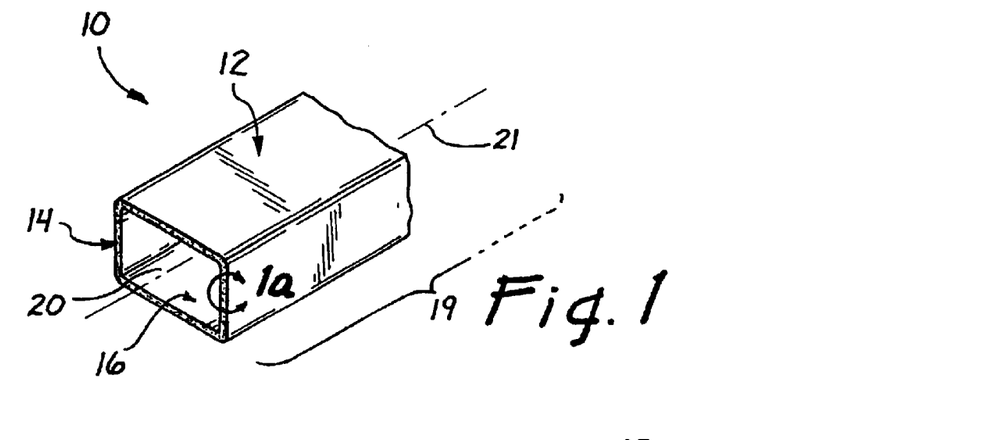
FIG. 1 is a perspective view of a portion of layered composite in accordance with the present invention.

Turning now to FIG. 1, a lightweight, durable, weatherable layered composite member in accordance with the present invention is shown generally at 10. The composite 10 is useful as a construction element when assembled together with other similar composite members in accordance with the invention. For example, the composite member 10 may be used as a fence post or fence rail in a complete fencing system or as a decking plank in a complete decking system.

Figures 1A, 3A:
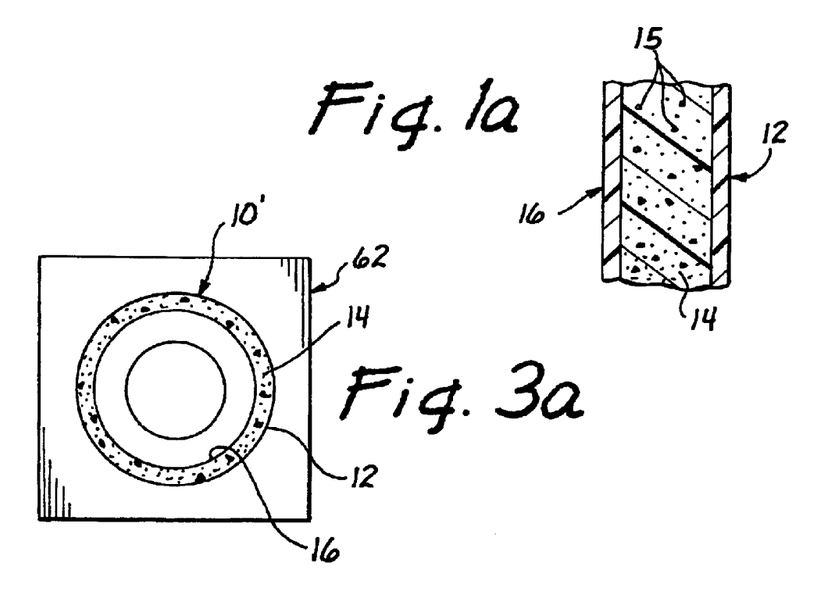
FIG. 1a is a cross-sectional view of the layered composite taken generally across line 1a—1a of FIG. 1.
FIGS. 3a and 3b are cross-sectional views of the apparatus taken generally lines 3a—3a and 3b—3b of FIG. 2, respectively.

Turning now as well to FIG. 1a, a portion of the composite member 10 is shown in cross-sectional view. The composite member 10 generally comprises a weatherable outer "skin" layer 12 comprising a first polymeric material, a core layer 14 circumscribed by the outer layer 12 and comprising a second polymeric material, and an inner layer 16 circumscribed by the core layer and comprising a third polymeric material. The inner layer 16 defines a hollow space 20. Preferably, at least two of the first, second and third polymeric materials have different chemical compositions as will be described in detail hereinafter.

The composite member 10 has a length 19 along a longitudinal axis 21, and the hollow space 20 extends along substantially the entire length 19 of the member 10. As shown in FIG. 1, the member 10 may have a rectangular cross-section perpendicular to the longitudinal axis 21, although other cross-sectional shapes are possible, depending upon the particular application of the composite member 10. In one particularly useful embodiment of the invention, the composite member 10 is in the form of a fence component, such as a rail or post for example.

Although not shown in detail, preferably the core layer 14 is, circumscribed by the outer layer 12 along substantially the entire length 19 of the member 10 and the inner layer 16 is, circumscribed by the core layer 14 along substantially the entire length 19 of the member 10.

As will be described hereinafter, the composite member 10 preferably is formed using a single coextrusion process by introducing each of the first, second and third polymeric materials, in extrudable form, into a different extrusion pathway of a single extruder/feedblock/pipehead assembly. Advantageously, the layers 12, 14, 16 of the composite member 10 are bonded together, during the extrusion process, and thus are held together without the aid of glues, adhesives, bonding agents or the like. To this extent at least, the first, second and third polymeric materials can be said to be compatible. Put another way, the first, second and third polymeric materials are selected to be effectively bonded together without the need of glues, adhesives, bonding agents and the like.

Preferably, the outer layer 12 comprises a relatively thin layer of solid "weatherable" polymeric material. Suitable weatherable materials for the outer layer 12 include, without limitation, thermoplastic polymeric materials, such as polyvinylchloride, acrylonitrile/styrene/acrylic ("ASA") polymeric materials and the like, and mixtures, combinations or alloys thereof. The presently useful ASA polymeric materials can be made using any suitable methodology. See, for example, Hughes U.S. Pat. No. 5,883,191; Yu et al U.S. Pat. No. 3,944,631; Aliberto et al. U.S. Pat. No. 4,517,339; Ting U.S. Pat. No. 4,731,414; Ting U.S. Pat. No. 4,831,079; and Moringa et al. U.S. Pat. No. 4,151,226. The disclosure of each of these patents is hereby incorporated in its entirely herein by reference. Such ASA polymeric materials may be physical blends or mixtures of styrene/acrylonitrile copolymers and acrylic polymers and copolymers; acrylonitrile/styrene/acrylic terpolymers, interpolymers including styrene-based units, acrylonitrile-based units and acrylic-based units, and the like and mixtures and combinations thereof.

The core layer 14 preferably comprises the second polymeric material and an effective amount of a filler. The core layer 14 may include a wood component, in the form of wood particles 15, in an effective amount as a filler. The core layer 14 may comprise any suitable second polymeric material selected from, for example, without limitation, polyvinylchloride, acrylonitrile/styrene acrylic (ASA) polymeric materials, acrylonitrile/butadiene/styrene ("ABS") polymeric materials, and mixtures, combinations and alloys thereof, and a filler component, preferably a wood component, in an amount effective as a filler in the composition. Suitable ASA/filler compositions and methods for making such compositions are described in Hughes, U.S. Pat. No. 6,133,349, the disclosure of which is incorporated in its entirety herein by reference.

The second polymeric material may be solid or a polymeric foam material and is present in the core layer 14 in an amount in the range of about 15% to about 90% or about 95% or about 99.5% of the total weight of the core layer. The filler component preferably is present in the core layer 14 in an amount in the range of about 0.5% or about 5% or about 10% to about 60% or about 70% or about 85% based on total weight of the core layer.

Although the wood component may be present in any suitable form, it is preferred that the wood be present as wood particles, such as wood chips, wood flakes, sawdust, wood flour, and the like and mixtures thereof. More preferably, such particles have a size in the range of about 40 to about 200 U.S. mesh, still more preferably, about 50 to about 150 U.S. mesh.

More preferably, the second polymeric material making up the core layer 14 is produced using straightforward physical mixing or blending methods, and without one or more complex polymerization steps being required. Control of the make-up and physical properties of such physically blended ASA polymeric material is more easily achieved than with compositions involving one or more polymerizations. Suitable physical blending methods are described in Hughes U.S. Pat. No. 5,883,191.

Although the filler component of the core layer material preferably comprises wood particles, it is to be appreciated that other fillers may be included as alternatives or in addition to the wood component. For example, the filler material may comprise carbon fibers, organic materials or other known filler materials. Wood is a preferred filler component because it is lightweight, strong, readily obtainable, and relatively inexpensive. Furthermore, in addition to the filler, the composition may contain effective amounts of one or more additional agents, such as pigments, processing aides, lubricants, antioxidants and stabilizers such as ultraviolet light and thermal stabilizers, and the like.

In one embodiment of the present invention, the core layer 14 comprises a composition of a substantially uniform blend of an uncrossed-linked acrylonitrile/styrene copolymer, for example, a linear uncross-linked acrylonitrile/styrene copolymer, an acrylate copolymer, such as a cross-linked alkyl acrylate/graft (meth)acrylate copolymer, and filler, for example, wood component particles.

Very useful results are obtained with the wood component being selected from pine wood, woods softer than pine wood, such as fir wood and the like, and mixtures thereof. The wood component may also include a wood which is harder than pine wood, such as oak wood, walnut wood, hickory wood, maple wood and the like and mixtures thereof. One very useful combination is a wood component which includes a first wood at least as soft as pine wood and a second wood harder than pine wood. In this embodiment, the first wood preferably is present in a major amount, that is at least 50% of the total wood present, while the relatively hard wood is present in a minor amount, that is less than 50% of the total wood present. The wood component may, and preferably does, act to reinforce the present compositions.

In a particularly useful embodiment the present invention, the wood-filled compositions forming the core layer 14 include an increased amount of lubricant relative to the amount of lubricant included in a similar composition without the filler, e.g., wood. Such increased amount of lubricant is effective in facilitating forming a substantially uniform physical blend of the components of the composition, particularly, since the filler, e.g., wood, being employed is often relatively dry and/or relatively incompatible with the copolymer components of the compositions. The amount of lubricant used preferably increases as the amount of filler particles increase. The amount of lubricant used may vary widely depending on the specific lubricant employed. The amount of lubricant employed may be in a range of about 0.1% or about 0.5% to about 2% or about 5%, by weight of the total composition.

Methods for forming a wood-filled composition useful in the present composites, comprise providing an uncross-linked acrylonitrile/styrene copolymer; providing a cross-linked alkyl acrylate/graft (meth)acrylate copolymer; providing filler component particles and forming a substantially uniform physical blend of these two copolymers and the filler particles. This physical blend preferably is substantially free of cross-linked acrylonitrile/styrene copolymer.

The substantially uniform blend formed preferably includes at least about 30% by weight, based on the total weight of the copolymers present, of the uncross-linked acrylonitrile/styrene copolymer and at least about 5% by weight, based on the total weight of the copolymers present, of the cross-linked alkyl acrylate/graft (meth)acrylate copolymer and an amount of filler component particles effective as a filler in the final composition. More preferably, the uncross-linked acrylonitrile/styrene copolymer is present in an amount in a range of about 30% to about 95% by weight based on the total weight of the copolymer and the cross-linked alkyl acrylate/graft (meth)acrylate copolymer is present in an amount in a range of about 5% to about 70% by weight based on the total weight of the copolymers. It is preferred that, during the forming step, substantially no polymerization occurs.

The inner layer 16, which bounds the generally central, hollow space 20 of the composite member 10, can be made of any suitable thermoplastic material, preferably a solid thermoplastic material, which need not be weatherable, but preferably is effectively impact resistant for providing strength during fence assembly and/or use. Examples of polymeric materials that are useful for inclusion in the inner layer 16, include, without limitation, polyvinylchloride, acrylonitrile/butadiene/styrene polymeric materials, and the like and mixtures, alloys or combinations thereof.

Figure 2:
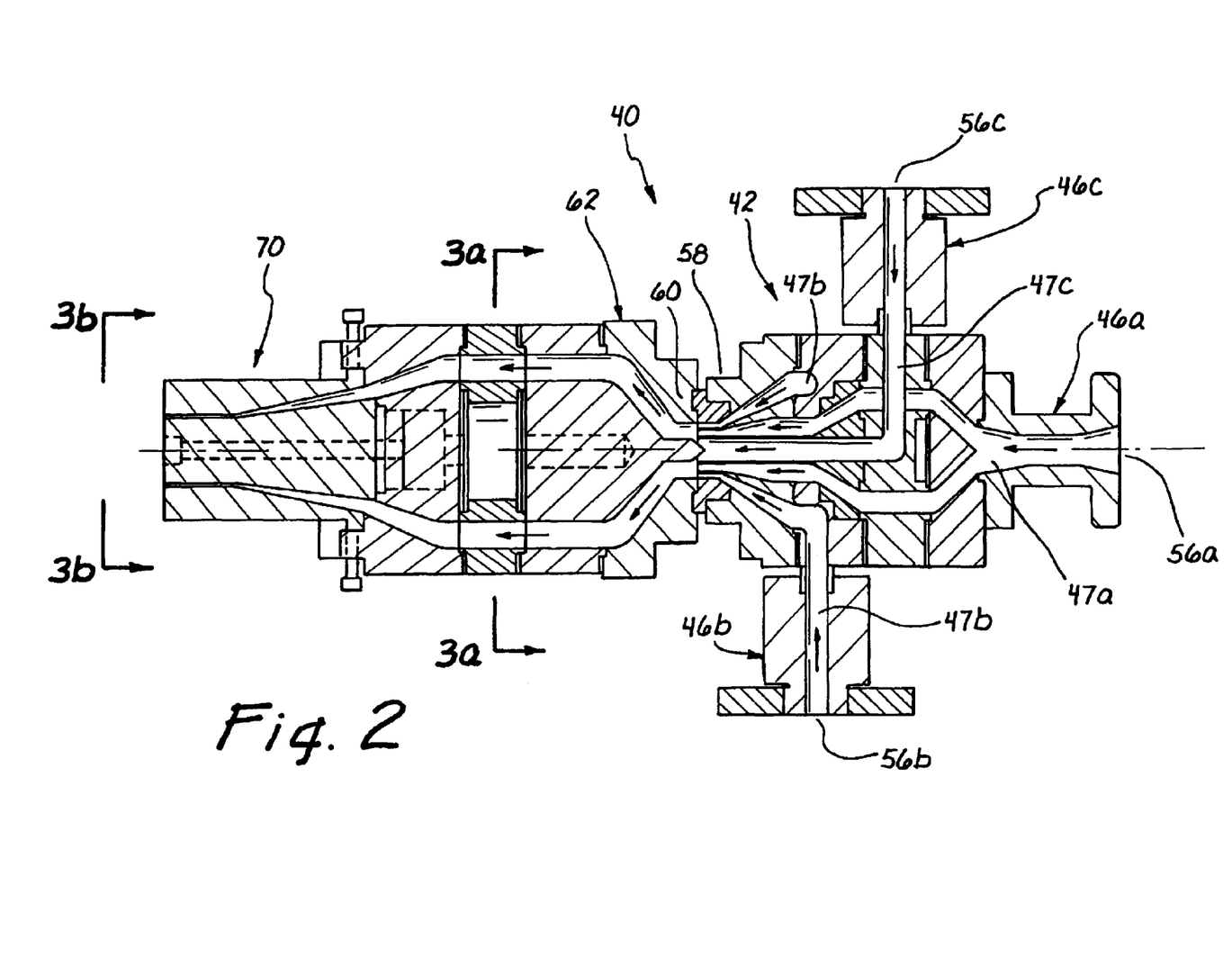
FIG. 2 is a cross-sectional view of an apparatus useful for producing a layered composite in accordance with the present invention.

Referring now to FIG. 2, the composite member 10 (not shown in FIG. 2) can be produced using co-extrusion techniques. Useful coextrusion assemblies, for producing a layered, extruded composite having a radially stratified annular form are disclosed in Rosenbaum U.S. Pat. Nos. 4,125,585 and 4,208,175, the disclosure of both of which are incorporated herein in their entireties by reference. For example, as shown schematically, a single extruder/feedblock/pipehead assembly 40, comprising a coextrusion feedblock 42 adapted to be fed by three extruders 46a, 46b, 46c is shown. Each extruder 46a, 46b, 46c defines a separate extruder pathway 47a, 47b, and 47c, respectively. Each of the compositions (i.e. the first polymeric material, second polymeric material and third polymeric material) is introduced into a different one of the extruder pathways 47a, 47b, and 47c and extruded to yield a radially layered, substantially circular cylindrical form. This form is then reshaped to a desired axial cross-section and cut to a desired length.

More specifically, the wood-filled core layer material, preferably along with a conventional polymeric material blowing agent, such as sodium bicarbonate, azodicarbonamide and the like, is fed into inlet 56a of first extruder 46a. The outer layer material and the inner layer material are fed into coextruder inlets 56b and 56c respectively. The coextrusion feedblock 42 is operable to produce a circular cylindrical form of inner layer material, core material and outer layer material at zone 58. This cylindrical form is fed directly into an inlet 60 of a pipehead forming die 62, connected to the feedblock 42, as shown. The assembly 40 produces an annular, or pipe-shaped form of the composite materials 12, 14, 16 at zone 64 which is substantially free of radial and circumferential maldistributions, as shown in cross-section in FIG. 3a.

Figure 3B:
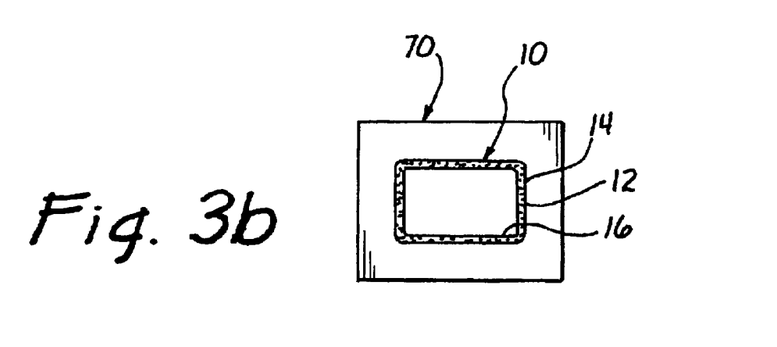

Turning back to FIG. 2, the form is then passed through another forming die, or shaping die, 70 connected to the pipehead die 62, which shapes and compresses the form to produce a composite of indefinite length having the desired axial cross-sectional shape. See cross-sectional view in FIG. 3b.

The shaped form extruded from the assembly 40 is then cut to a length suitable for the desired application. In addition, the composite may be produced to have wall or layer thicknesses suitable for the desired application. These thicknesses can vary widely.

For a typical application, the composite member 10 preferably has a composite wall thickness (radial thickness) in a range of about 0.06 inches to about 1.7 inches, for example, a thickness of about 0.1 inches to about 0.6 inches. The core layer 14 preferably has a thickness (radial thickness) in a range of about 0.04 inches to about 0.9 inches, and the outer layer and the inner layer each, independently, preferably has a thickness (radial thickness) in a range of about 0.01 inches to about 0.4 or about 0.7 inches.

Figures 7, 8:
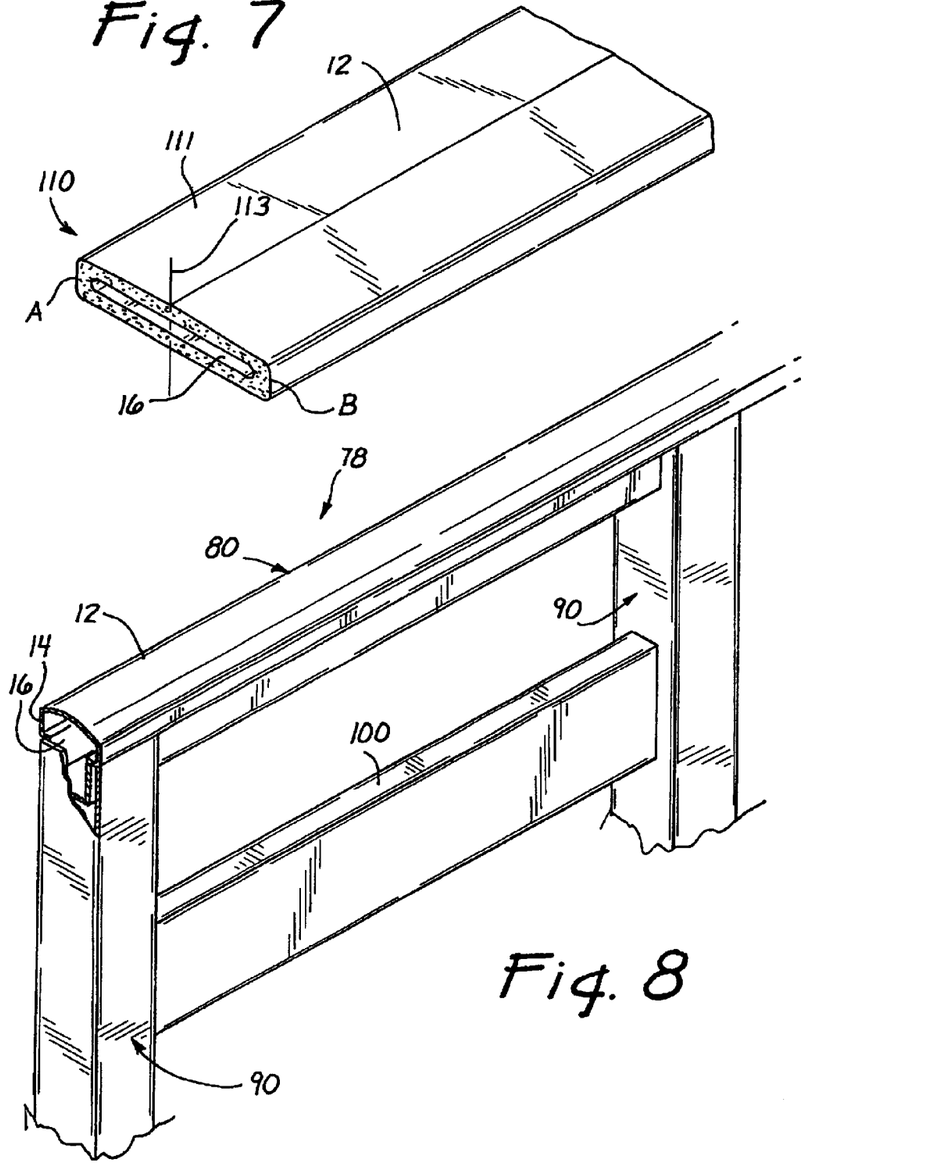
FIG. 8 shows a fencing system in accordance with one embodiment of the invention.

For purposes of example only, various cross-sectional shapes of layered, hollow composites in accordance with the present invention are shown in FIGS. 4–7, and a simplified illustration of a fencing system 78 is shown in FIG. 8.

Figures 4, 5, 6:
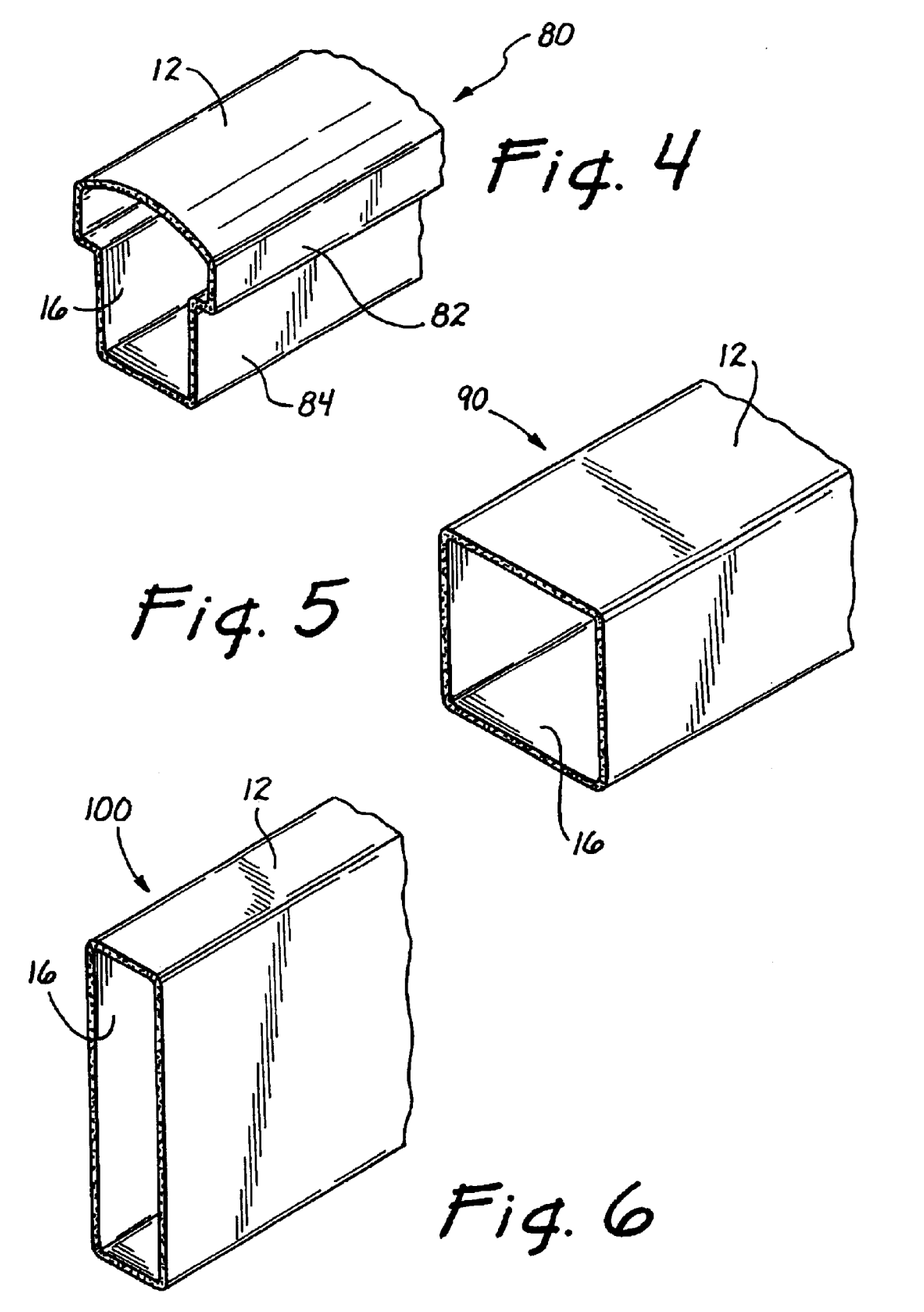
FIGS. 4–7 show perspective views of different cross-section shapes of composites in accordance with the present invention.

More specifically, FIG. 4 shows a rail extrusion component 80 which can be used as an upper rail of a fencing system 78 in accordance with the invention. As shown, the rail extrusion component 80 includes a cross-sectional shape, perpendicular to a longitudinal axis, that includes a somewhat rounded, widened upper portion 82 relative to a rectangular, more narrow lower portion 84. FIG. 5 shows a post extrusion component 90 having a square cross-sectional shape perpendicular to a longitudinal axis thereof, and FIG. 6 shows an alternative rail extrusion component 100 having an elongated rectangular shape. The components can be formed to any convenient length depending upon the particular fencing application desired.

FIG. 7 shows a preferred decking plank component 110 having an elongated, generally rectangular shape and having a slightly sloping upper outer surface 111, which facilitates water run-off when the decking plank 110 is combined with other such planks to form a generally horizontally positioned deck. To illustrate the extent of this sloping, the composite 110 may be about 5.5 inches wide, from surface A to surface B. The wall thickness of composite 110 is about 0.3 inches. The height of composite 110 at the center line 113 is about 1.0625 inches and at surfaces A and B is about 1.00 inch. This difference results in the sloping of upper outer surface 111. A plurality of planks 110 can be secured together, for example, on wooden crossbars, to form a completed deck.

In addition, the thin outer layer 12 of the composite member and components 10, 80, 90, 100, 110 in accordance with the invention can be painted with any suitable weather resistant paint, finish or varnish to achieve a desired appearance. Moreover, the wood particles in the core layer material can be selected so as to produce a desired look and/or texture to the finished product. It will be appreciated that, as with other fencing components, the composites in accordance with the present invention may include cut-out portions, brackets, fasteners and the like (not shown) for facilitating assembly of a complete fencing system.

A process for manufacturing a layered composite is also provided by the present invention. The process generally comprises the steps of providing the materials described hereinabove, in flowable or extrudable form, and forming a cylindrical flow of the materials, reshaping the cylindrical flow into a desired cross-sectional shape to achieve a composite having substantially uniform layers surrounding a generally central hollow space, and cutting the reshaped flow into a desired length.

For example, the forming step includes introducing the polymer materials, which will make up the outer layer and inner layer, and the wood-filled polymer material which will make up the core layer, into an extruder assembly while the materials are in an extrudable form. For example, the outer layer and inner layer materials may be subjected to elevated temperatures and/or pressures prior to being introduced into the extruder assembly.

The wood-filled thermoplastic material is provided in an extrudable form by subjecting a mixture of, for example, acrylonitrile/styrene/acrylic polymeric material and wood particles, to conditions effective to produce a substantially uniform, flowable or extrudable composition. Such conditions are described in detail in incorporated Hughes U.S. Pat. No. 6,133,349, and can generally include for example, elevated temperature conditions, elevated pressure conditions, shear or mixing conditions and combinations thereof. The substantially uniform composition is then introduced in a suitable coextrusion assembly along with the outer layer and inner layer materials, and formed by suitable connecting shapers or dies, into useful shapes and configurations as described hereinabove. It is preferable that, during the forming step, substantially no polymerization occurs. The composite can be subjected to any post-processing steps, such as texturing, painting and the like as may be desirable. Advantageously, the layered composites in accordance with the present invention do not require any mechanical means to secure the layers together. The co-extrusion process described hereinabove causes the layers to bond together without the aid of adhesives, glue, bonding agents or the like.

Multiple composites, such as various fence post and fence rail configurations, in accordance with the invention, may be packaged together and sold as a fencing system kit.

While this invention has been described with respect to various specific examples and embodiments, it is to be understood that the invention is not limited thereto and that it can be variously practiced within the scope of the following claims.

What is claimed is:

1. A composite having a length, the composite comprising:
    an outer layer comprising a first polymeric material; a core layer substantially completely circumscribed by the outer layer and comprising a thermoplastic polymeric foam second polymeric material including a wood component in an amount effective as a filler; and
    an inner layer substantially completely circumscribed by the core layer and comprising a third polymeric material, wherein the inner layer defines a hollow space extending along the entire length of the composite;
    the composite being a coextruded composite.
2. The composite of claim 1 wherein at least two of the first, second and third polymeric materials have different chemical compositions.
3. The composite of claim 1 wherein at least one of the first and third polymeric materials is a thermoplastic polymeric material.
4. The composite of claim 1 wherein each of the first and third polymeric materials is a thermoplastic polymeric material.
5. The composite of claim 1 wherein the composite has a substantially rectangular cross-section perpendicular to the length.
6. The composite of claim 1 wherein the core layer is substantially completely circumscribed by the outer layer along substantially the entire length of the composite and the inner layer is substantially completely circumscribed by the core layer along substantially the entire length of the composite.
7. The composite of claim 1 wherein the first polymeric material is weatherable.
8. The composite of claim 1 wherein the first polymeric material is selected from the group consisting of polyvinylchloride, acrylonitrile/styrene/acrylic polymeric materials and combinations thereof.
9. The composite of claim 1 wherein the second polymeric material is selected from the group consisting of polyvinylchloride, acrylonitrile/styrene/acrylic polymeric materials, and combinations thereof.
10. The composite of claim 1 wherein the third polymeric material is polyvinylchloride.
11. The composite of claim 1 in the form of a fence component or a decking component.
12. The composite of claim 1 wherein the first polymeric material and the third polymeric material are both polyvinylchloride, and the core layer comprises a wood-filled acrylonitrile/styrene/acrylic polymeric material.
13. The composite of claim 1 wherein the first polymeric material and the third polymeric material are both polyvinylchloride, and the second polymeric material is selected from the group consisting of polyvinylchloride, acrylonitrile/styrene/acrylic polymeric materials and combinations thereof.
14. The composite of claim 13 wherein the core layer includes a wood component in an amount effective as a filler.
15. A composite component having a length, the composite component comprising:
    a weatherable outer layer comprising a first polymeric material;
    a core layer substantially completely circumscribed by the outer layer and comprising a wood-filled thermoplastic foam second polymeric material; and
    an inner layer substantially completely circumscribed by the core layer and comprising a thermoplastic third polymeric material, wherein the inner layer defines a hollow space, the composite component being a fence component or a decking component;
    the composite component being coextruded and having a cross-sectional area perpendicular to the length and the cross-sectional area having a substantially uniform size and shape along the entire length of the composite component, and the hollow space extending along the entire length of the composite component.
16. The component of claim 15 wherein at least two of the first, second and third polymeric materials have different chemical compositions.
17. The component of claim 15 wherein the core layer is substantially completely circumscribed by the outer layer along substantially the entire length of the composite component and the inner layer is substantially completely circumscribed by the core layer along substantially the entire length of the composite component.
18. The component of claim 15 in the form of a fence post.
19. The component of claim 15 in the form of a fence rail.
20. The component of claim 15 in the form of a decking plank.
21. The component of claim 15 wherein the first polymeric material is selected from the group consisting of polyvinylchloride, acrylonitrile/styrene/acrylic polymeric materials and combinations thereof.
22. The composite of claim 15 wherein the first polymeric material and the third polymeric material are both polyvinylchloride, and the second polymeric material is acrylonitrile/styrene/acrylic polymeric material.
23. The composite of claim 15 wherein the first polymeric material and the third polymeric material are both polyvinylchloride, and the second polymeric material is selected from the group consisting of polyvinylchloride, acrylonitrile/styrene/acrylic polymeric materials and combinations thereof.
24. A fencing system comprising:
    a plurality of fence posts; and
    a plurality of fence rails fastened to the plurality of fence posts so as to form a fence, wherein each of said fence posts and fence rails comprises
    a weatherable outer layer comprising a first polymeric material;
    a core layer substantially completely circumscribed by the outer layer and comprising a wood-filled thermoplastic foam second polymeric material; and
    an inner layer substantially completely circumscribed by the core layer and comprising a thermoplastic third polymeric material, wherein the inner layer defines a hollow space;

each of said fence posts and rails being a coextruded composite having a length and a cross-sectional area perpendicular to the length and the cross-sectional area having a substantially uniform size and shape along the entire length, and the hollow space extending along the entire length of the composite.

25. The system of claim 24 wherein at least two of the first, second and third polymeric materials have different chemical compositions.

26. The system of claim 24 wherein at least one of the plurality of fence posts and the plurality of fence rails have substantially rectangular cross-sections perpendicular to the lengths.

27. The system of claim 24 wherein the core layer is substantially completely circumscribed by the outer layer along substantially the entire length of each of said fence posts and rails, and the inner layer is substantially completely circumscribed by the core layer along substantially the entire length of each of said fence posts and rails.

28. The system of claim 24 wherein the first polymeric material is selected from the group consisting of polyvinylchloride, acrylonitrile/styrene/acrylic polymeric materials and combinations thereof.

29. The composite of claim 24 wherein the first polymeric material and the third polymeric material are both polyvinylchloride, and the second polymeric material is an acrylonitrile/styrene/acrylic polymeric material.

30. The composite of claim 24 wherein the first polymeric material and the third polymeric material are both polyvinylchloride, and the second polymeric material is selected from the group consisting of polyvinylchloride, acrylonitrile/styrene/acrylic polymeric materials and combinations thereof.

31. A composite having a length, the composite comprising:

an outer layer comprising a first polymeric material;

a core layer circumscribed by the outer layer and comprising a second polymeric material which is a thermoplastic polymeric foam material and includes a wood component in an amount effective as a filler; and an inner layer circumscribed by the core layer and comprising a third polymeric material, wherein the inner layer defines a hollow space extending along the entire length of the composite;

the composite being a coextruded composite.

32. A composite having a length, the composite comprising:

an outer layer comprising a polyvinylchloride first polymeric material;

a core layer circumscribed by the outer layer and comprising a second polymeric material which is a thermoplastic polymeric material and includes a wood component in an amount effective as a filler, the second polymeric material is selected from the group consisting of polyvinylchloride, acrylonitrile/styrene/acrylic polymeric materials and combinations thereof; and an inner layer circumscribed by the core layer and comprising a polyvinylchloride third polymeric material, wherein the inner layer defines a hollow space extending along the entire length of the composite;

the composite being a coextruded composite.

33. A composite having a length, the composite comprising:

an outer layer comprising a first polymeric material;

a core layer circumscribed by the outer layer and comprising a second polymeric material which is a thermoplastic polymeric material selected from the group consisting of polyvinylchloride, acrylonitrile/styrene/acrylic polymeric materials and combinations thereof; and an inner layer circumscribed by the core layer and comprising a third polymeric material, wherein the inner layer defines a hollow space extending along the entire length of the composite;

the composite being a coextruded composite and the first polymeric material and the third polymeric material are both polyvinylchloride.

34. The composite of claim 33 wherein the core layer includes a wood component in an amount effective as a filler.

35. A composite component having a length, the composite component comprising:

a weatherable outer layer comprising a first polymeric material;

a core layer circumscribed by the outer layer and comprising a wood-filled thermoplastic second polymeric foam material; and an inner layer circumscribed by the core layer and comprising a thermoplastic third polymeric material, wherein the inner layer defines a hollow space, the composite component being a fence component or a decking component;

the composite component being coextruded and having a cross-sectional area perpendicular to the length and the cross-sectional area having a substantially uniform size and shape along the entire length of the composite component, and the hollow space extending along the entire length of the composite component.

36. A fencing system comprising:

a plurality of fence posts; and a plurality of fence rails fastened to the plurality of fence posts so as to form a fence, wherein each of said fence posts and fence rails comprises a weatherable outer layer comprising a first polymeric material;

a core layer circumscribed by the outer layer and comprising a wood-filled thermoplastic second polymeric foam material; and an inner layer circumscribed by the core layer and, comprising a thermoplastic third polymeric material, wherein the inner layer defines a hollow space;

each of said fence posts and rails being a coextruded composite having a length and a cross-sectional area perpendicular to the length and the cross-sectional area having a substantially uniform size and shape along the entire length, and the hollow space extending along the entire length of the composite.

37. A composite component having a length, the composite component comprising:

a weatherable outer layer comprising a first polymeric material;

a core layer circumscribed by the outer layer and comprising a wood-filled thermoplastic second polymeric material which is an acrylonitrile/styrene/acrylic polymeric material; and an inner layer circumscribed by the core layer and comprising a thermoplastic third polymeric material, wherein the inner layer defines a hollow space, the composite component being a fence component or a decking component;

the composite component being coextruded and having a cross-sectional area perpendicular to the length and the cross-sectional area having a substantially uniform size and shape along the entire length of the composite component, and the hollow space extending along the entire length of the composite component, the first polymeric material and the third polymeric material are both polyvinylchloride.

38. A composite component having a length, the composite component comprising:

a weatherable outer layer comprising a first polymeric material;

a core layer circumscribed by the outer layer and comprising a wood-filled thermoplastic second polymeric material, the second polymeric material is selected from the group consisting of polyvinylchloride, acrylonitrile/styrene/acrylic polymeric materials and combinations thereof; and an inner layer circumscribed by the core layer and comprising a thermoplastic third polymeric material, wherein the inner layer defines a hollow space, the composite component being a fence component or a decking component;

the composite component being coextruded and having a cross-sectional area perpendicular to the length and the cross-sectional area having a substantially uniform size and shape along the entire length of the composite component, and the hollow space extending along the entire length of the composite component, the first polymeric material and the third polymeric material are both polyvinylchloride.

39. A fencing system comprising:

a plurality of fence posts; and a plurality of fence rails fastened to the plurality of fence posts so as to form a fence, wherein each of said fence posts and fence rails comprises a weatherable outer layer comprising a first polymeric material;

a core layer circumscribed by the outer layer and comprising a wood-filled thermoplastic second polymeric material which is an acrylonitrile/styrene/acrylic polymeric material; and an inner layer circumscribed by the core layer and comprising a thermoplastic third polymeric material, wherein the inner layer defines a hollow space;

each of said fence posts and rails being a coextruded composite having a length and a cross-sectional area perpendicular to the length and the cross-sectional area having a substantially uniform size and shape along the entire length, and the hollow space extending along the entire length of the composite, the first polymeric material and the third polymeric material are both polyvinylchloride.

40. A fencing system comprising:

a plurality of fence posts; and a plurality of fence rails fastened to the plurality of fence posts so as to form a fence, wherein each of said fence posts and fence rails comprises a weatherable outer layer comprising a first polymeric material;

a core layer circumscribed by the outer layer and comprising a wood-filled thermoplastic second polymeric material, the second polymeric material is selected from the group consisting of polyvinylchloride, acrylonitrile/styrene/acrylic polymeric materials and combinations thereof; and an inner layer circumscribed by the core layer and comprising a thermoplastic third polymeric material, wherein the inner layer defines a hollow space;

each of said fence posts and rails being a coextruded composite having a length and a cross-sectional area perpendicular to the length and the cross-sectional area having a substantially uniform size and shape along the entire length, and the hollow space extending along the entire length of the composite, the first polymeric material and the third polymeric material are both polyvinylchloride.

41. A composite having a length, the composite comprising:

an outer layer comprising a first polymeric material;

a core layer substantially completely circumscribed by the outer layer and comprising a second polymeric material which is a thermoplastic polymeric material; and an inner layer substantially completely circumscribed by the core layer and comprising a third polymeric material, wherein the inner layer defines a hollow space extending along the entire length of the composite;

the first polymeric material and the third polymeric material both comprising polyvinylchloride, and the core layer comprising a wood-filled acrylonitrile/styrene/acrylic polymeric material; and the composite being a coextruded composite.

42. A composite having a length, the composite comprising:

an outer layer comprising a first polymeric material;

a core layer substantially completely circumscribed by the outer layer and comprising a second polymeric material which is a thermoplastic polymeric material; and an inner layer substantially completely circumscribed by the core layer and comprising a third polymeric material, wherein the inner layer defines a hollow space extending along the entire length of the composite;

the first polymeric material and the third polymeric material both comprising polyvinylchloride, and the second polymeric material is an acrylonitrile/styrene/acrylic polymeric material; and the composite being a coextruded composite.

43. The composite of claim 42 wherein the core layer includes a wood component in an amount effective as a filler.

44. A composite component having a length, the composite component comprising:

a weatherable outer layer comprising a first polymeric material;

a core layer substantially completely circumscribed by the outer layer and comprising a wood-filled second thermoplastic material; and an inner layer substantially completely circumscribed by the core layer and comprising a thermoplastic third polymeric material, wherein the inner layer defines a hollow space, the composite component being a fence component or a decking component;

the first polymeric material and the third polymeric material both comprising polyvinylchloride, and the second polymeric material comprising an acrylonitrile/styrene/acrylic polymeric material; and the composite component being coextruded and having a cross-sectional area perpendicular to the length and the cross-sectional area having a substantially uniform size and shape along the entire length of the composite component, and the hollow space extending along the entire length of the composite component.

45. A composite component having a length, the composite component comprising:

a weatherable outer layer comprising a first polymeric material;

a core layer substantially completely circumscribed by the outer layer and comprising a wood-filled second thermoplastic material; and an inner layer substantially completely circumscribed by the core layer and comprising a thermoplastic third polymeric material, wherein the inner layer defines a hollow space, the composite component being a fence component or a decking component;

the first polymeric material and the third polymeric material both comprising polyvinylchloride, and the second polymeric material selected from the group consisting of polyvinylchloride, acrylonitrile/styrene/acrylic polymeric materials, and combinations thereof; and the composite component being coextruded and having a cross-sectional area perpendicular to the length and the cross-sectional area having a substantially uniform size and shape along the entire length of the composite component, and the hollow space extending along the entire length of the composite component.

46. A fencing system comprising:

a plurality of fence posts; and a plurality of fence rails fastened to the plurality of fence posts so as to form a fence, wherein each of said fence posts and fence rails comprises a weatherable outer layer comprising a first polymeric material;

a core layer substantially completely circumscribed by the outer layer and comprising a wood-filled thermoplastic second polymeric material; and an inner layer substantially completely circumscribed by the core layer and comprising a thermoplastic third polymeric material, wherein the inner layer defines a hollow space;

the first polymeric material and the third polymeric material both comprising polyvinylchloride, and the second polymeric material comprising acrylonitrile/styrene/acrylic polymeric material; and each of said fence posts and rails being a coextruded composite having a length and a cross-sectional area perpendicular to the length and the cross-sectional area having a substantially uniform size and shape along the entire length, and the hollow space extending along the entire length of the composite.

47. A fencing system comprising:

a plurality of fence posts; and a plurality of fence rails fastened to the plurality of fence posts so as to form a fence, wherein each of said fence posts and fence rails comprises a weatherable outer layer comprising a first polymeric material;

a core layer substantially completely circumscribed by the outer layer and comprising a wood-filled thermoplastic second polymeric material; and an inner layer substantially completely circumscribed by the core layer and comprising a thermoplastic third polymeric material, wherein the inner layer defines a hollow space;

the first polymeric material and the third polymeric material both comprising polyvinylchloride, and the second polymeric material selected from the group consisting of polyvinylchloride, acrylonitrile/styrene/acrylic polymeric materials, and combinations thereof; and each of said fence posts and rails being a coextruded composite having a length and a cross-sectional area perpendicular to the length and the cross-sectional area having a substantially uniform size and shape along the entire length, and the hollow space extending along the entire length of the composite.

* * * * *